United States Patent [19]

Wersosky

[11] Patent Number: 4,664,864
[45] Date of Patent: May 12, 1987

[54] MOLD LOADING METHOD AND APPARATUS

[75] Inventor: John M. Wersosky, Dover, N.H.

[73] Assignee: Ex-Cell-O Corporation, Troy, Mich.

[21] Appl. No.: 766,464

[22] Filed: Aug. 19, 1985

Related U.S. Application Data

[63] Continuation of Ser. No. 500,760, Jun. 3, 1983, abandoned.

[51] Int. Cl.⁴ ............................................. B29C 41/18
[52] U.S. Cl. .................................. 264/301; 264/302; 425/256; 425/257
[58] Field of Search ...................... 264/301, 308, 302; 425/256, 257; 193/14

[56] References Cited

U.S. PATENT DOCUMENTS

| | | | |
|---|---|---|---|
| 1,123,246 | 1/1915 | Clarke | 193/14 |
| 3,301,925 | 1/1967 | Engel | 264/255 |
| 3,315,016 | 4/1967 | Wersosky et al. | 264/26 |
| 3,418,694 | 12/1968 | Strauss | 264/37 |
| 3,492,307 | 1/1970 | Hoskinson | 264/302 |
| 3,506,755 | 4/1970 | Rudder et al. | 264/302 |
| 3,744,951 | 7/1973 | Szutkowski | 264/302 |
| 4,167,382 | 9/1979 | Freedman | 425/256 |
| 4,217,325 | 8/1980 | Colby | 264/301 |

Primary Examiner—James Derrington
Attorney, Agent, or Firm—John C. Evans

[57] ABSTRACT

Apparatus and a process for manufacturing thin walled hollow parts such as automobile crash pads from dry thermoplastic powder includes a louver type valve system in the open end of a powder charge box and means for joining the charge box end-to-end with an open-ended heated mold for rotation so that the charge box will be inverted above the mold at the end of an upward swing movement during which the valve is closed to prevent flow of powder to the mold. Once the charge box is fully inverted the valve is opened to evenly distribute the powder into the mold by gravity flow to prevent excessive build-up of wall thickness on the mold surfaces.

1 Claim, 16 Drawing Figures

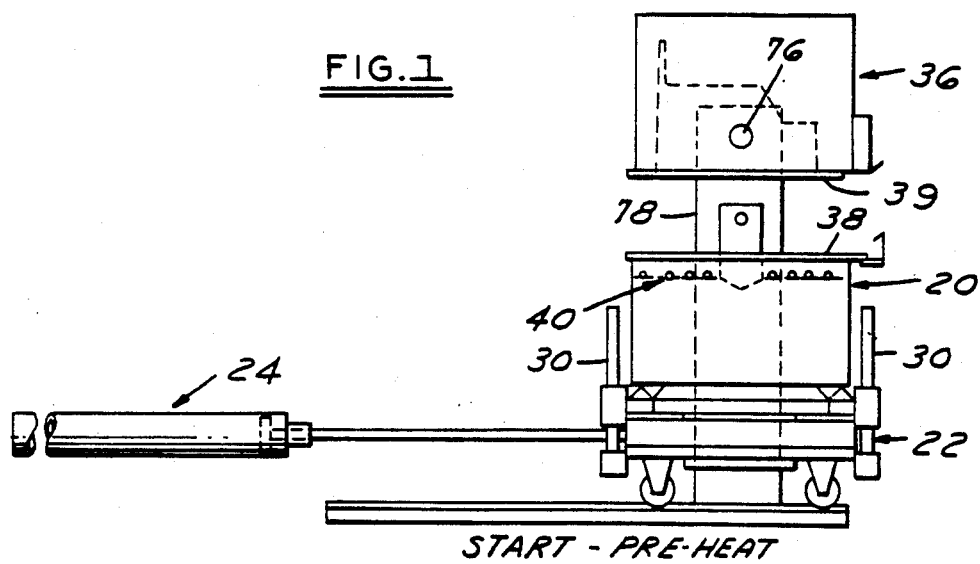
FIG. 1 START - PRE-HEAT
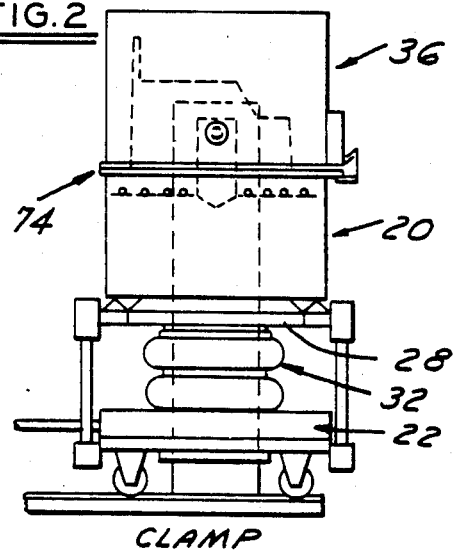
FIG. 2 CLAMP
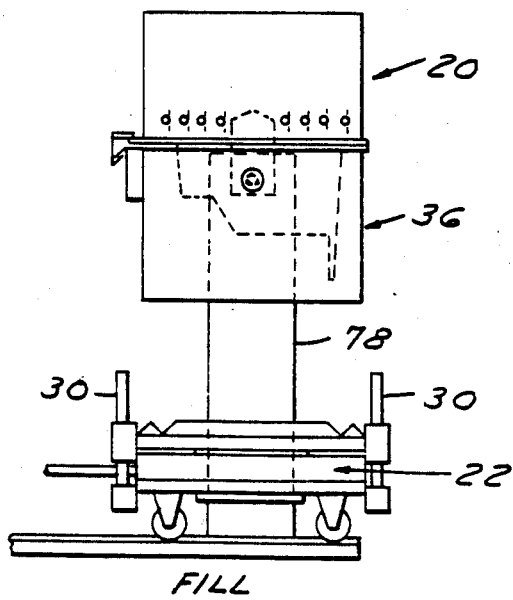
FIG. 3 FILL

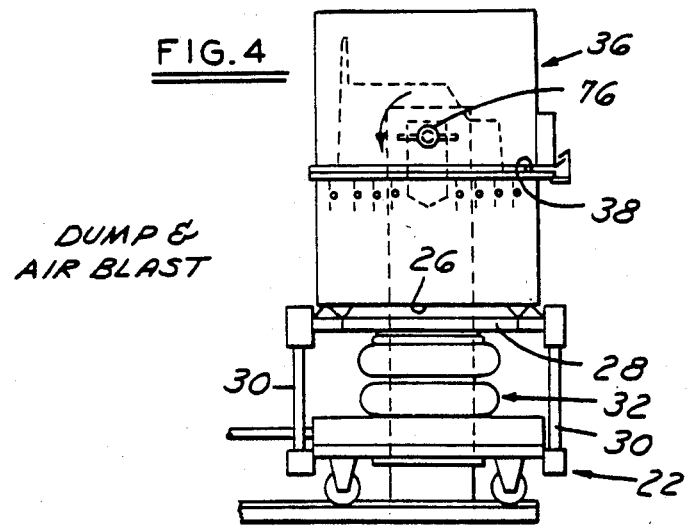
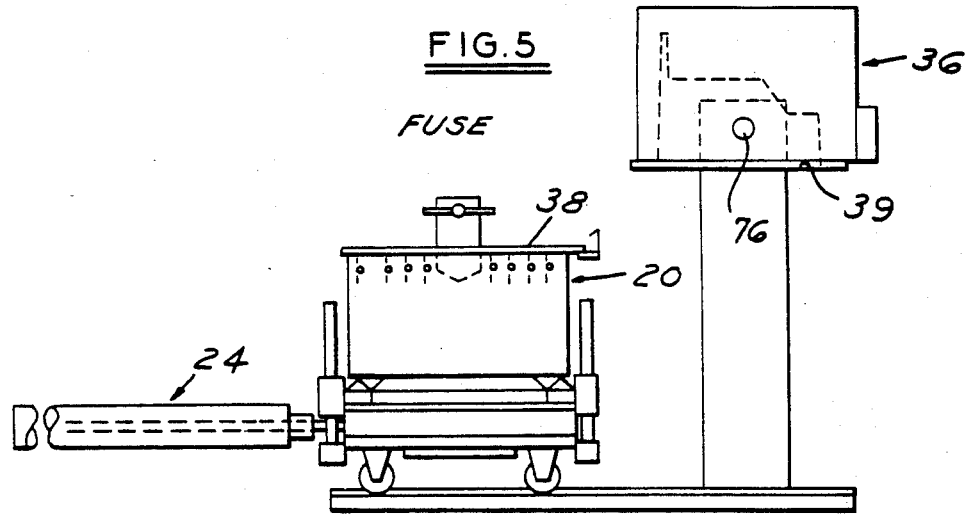
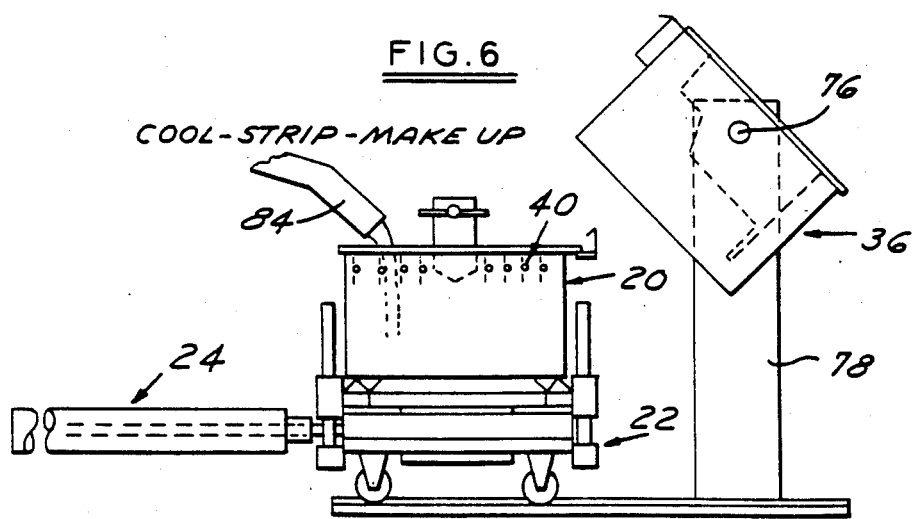

MOLD LOADING METHOD AND APPARATUS

This application is a continuation, of application Ser. No. 500,760, filed 06-03-83 now abandoned.

BACKGROUND OF THE INVENTION

This invention relates to a process and apparatus for the manufacture of thin-walled articles from a powdered thermoplastic and more particularly to the manufacture of such articles by use of a re-claiming and make-up powder supply and associated method and means for uniform distribution of thermoplastic powder against a heated mold surface which causes the powder to become fused.

Process and apparatus for molding hollow articles from powder thermoplastic material is set forth in U.S. Pat. No. 3,301,925 issued Jan. 31, 1967 to Engel and U.S. Pat. No. 3,492,307 issued Jan. 27, 1970 to Hutchinson. In the '307 patent interlocked mold and charge box components are rotated to distribute thermoplastic powder into the mold. In the '925 patent a stand-pipe spray system directs thermoplastic material against a heated mold surface and excess material is recycled by use of a gravity feed funnel. Other distribution and recycle systems for molding hollow articles from thermoplastic material are set forth in U.S. Pat. Nos. 3,315,016 and 3,418,694, respectively, issued Apr. 18, 1967 to Wersosky et al. and Strauss. The distribution of plastic is suitable for the mold configurations and product to be formed in these patents.

However, in order to produce optimum build-up of thermoplastic powder on heated walls of a mold surface such systems tend to expose certain regions of the mold to greater quantities of the powder fill and as a result such surfaces of the mold will have a thicker build-up of plastic formed thereon.

SUMMARY OF THE INVENTION

An object of the present invention is to provide an improved process and apparatus for loading an open-ended heated mold with powder plastisol material by the process of releasing a pre-charge of thermoplastic powder through the major axis of a charge box for gravity flow into the mold and by the provision of means to produce such release during a pre-selected mold machine operation.

Another object of the present invention is to provide an improved process for formation of hollow parts from thermoplastic powder material including the steps of loading an open-ended charge box with a predetermined quantity of powder; clamping the loaded open-ended charge box to an open-ended mold to form a closed system; sealing the mold from the powder content in the charge box while concurrently rotating the enclosed system so that the charge box is located vertically above the mold and thereafter releasing the powder from the charge box to flow evenly across the open end of the mold by gravity so as to produce a uniform thin coat build-up across heated surfaces of the mold.

Another object of the present invention is to provide a plastics molding apparatus having a gravity fill system for flow of powder material into a heated mold to form a thin walled hollow plastic part and for return of excess powder material from the mold including a charge box having a plurality of louvers extending across an open end of the powder box, the open end having a planar extent at least equal to the planar extent of the end of an associated mold; means for coupling the powder box to the mold to define a rotatable closed system and means for operating the louvers to close communication between the powder box interior and mold interior during a pre-fill phase wherein the closed system is rotated to dispose the charge box above the mold for gravity flow of powder into the mold and said means being operable to open the louvers to produce even gravity flow of powder across the open end of the mold so as to uniformly coat heated surfaces of the material with plastic.

A further object of the present invention is to provide a plastics molding apparatus as set forth in the preceding object wherein means are provided to invert the closed system and air blast excess unfused plastic material from the mold to gravity dump it into the powder box for use in a subsequent mold cycle.

In a preferred embodiment the mold is pivotally supported on a frame and the charge box is selectively moved beneath the mold and coupled to the mold for concurrent rotation therewith on the frame. The charge box has a plurality of louvers at an open end thereof selectively opened and closed to control flow of powder from the mold during rotation of the box to a vertically upper position for an even gravity flow distribution of a powder charge from the box into the mold so as to produce a uniform thin build-up of plastic particles on heated surfaces of the mold. The charge box further includes a longitudinal bar type air jet system operable when the charge box is in a receiver position for gravity flow return of excess powder from the mold to the charge box for use in a subsequent mold fill cycle.

Other objects and advantages and a more complete understanding of the invention will be apparent to those skilled in the art from the succeeding detailed description of the invention and the accompanying drawings thereof.

BRIEF DESCRIPTION OF DRAWINGS

FIGS. 1-6 illustrate steps of an automated powder mold process and apparatus for manufacture of thin walled hollow parts in accordance with principles of the present invention;

DESCRIPTION OF THE PREFERRED EMBODIMENT

The process and apparatus of the present invention will be with reference to the production of plastic thin-walled hollow parts for a typical automotive part such as a skin for an instrument panel crash pad having a length of about 60 inches, a surface of approximately 17 square feet and a volume of about 6900 cubic inches.

Referring to FIG. 1, a start and pre-heat step is shown in an automated powder molding process line which is schematically shown as including a powder charge box 20 mounted on a wheeled cart 22 driven by a hydraulic drive cylinder 24 to the start-pre-heat step position in the process sequence.

Figure 7:
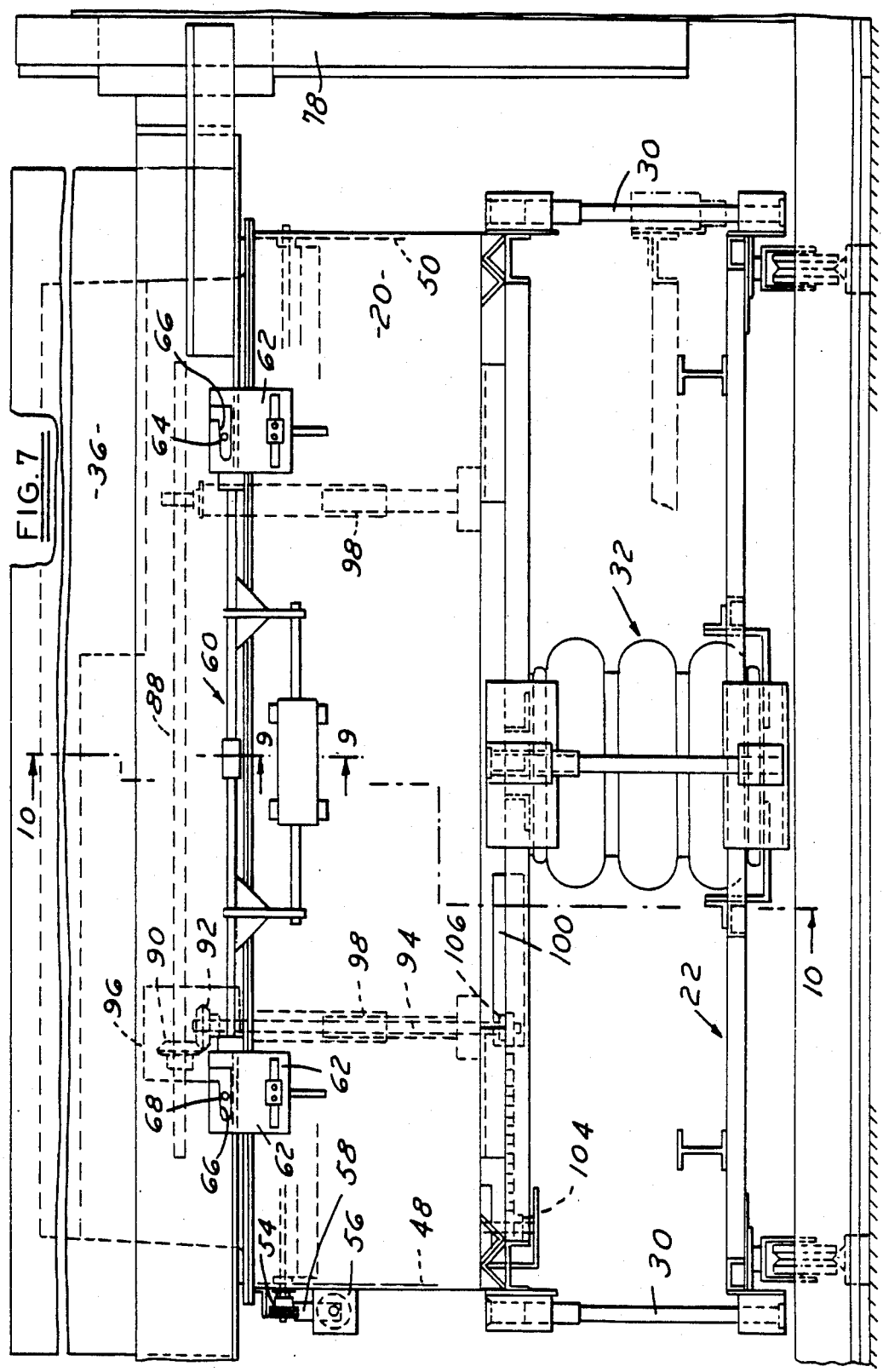
FIG. 7 is an enlarged side elevational view of mold and charge box components of the system at the FIG. 2 step.
Figure 8:
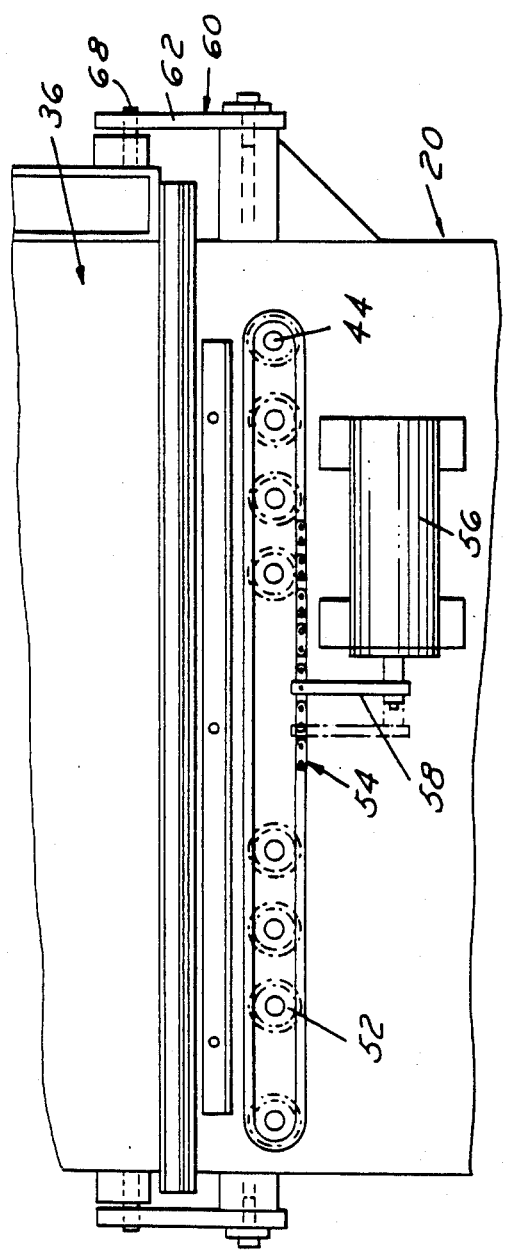
FIG. 8 is a fragmentary end elevational view of a drive system for louvers to control powder release in accordance with the invention.
Figure 9:
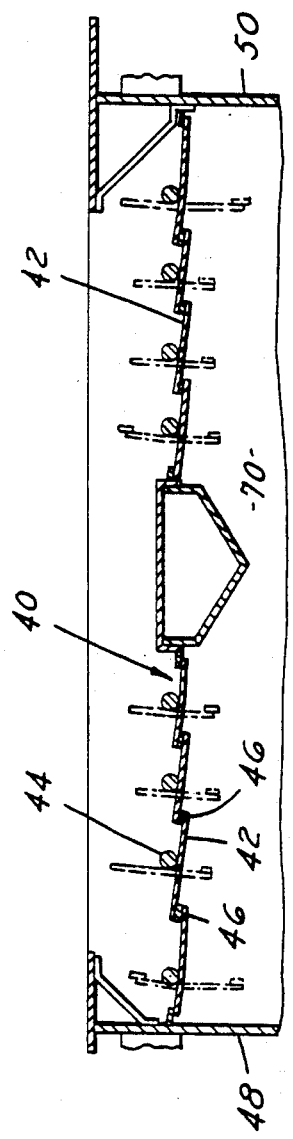
FIG. 9 is an enlarged fragmentary sectional view taken along the line 9—9 of FIG. 7 looking in the direction of the arrows.
Figure 10:
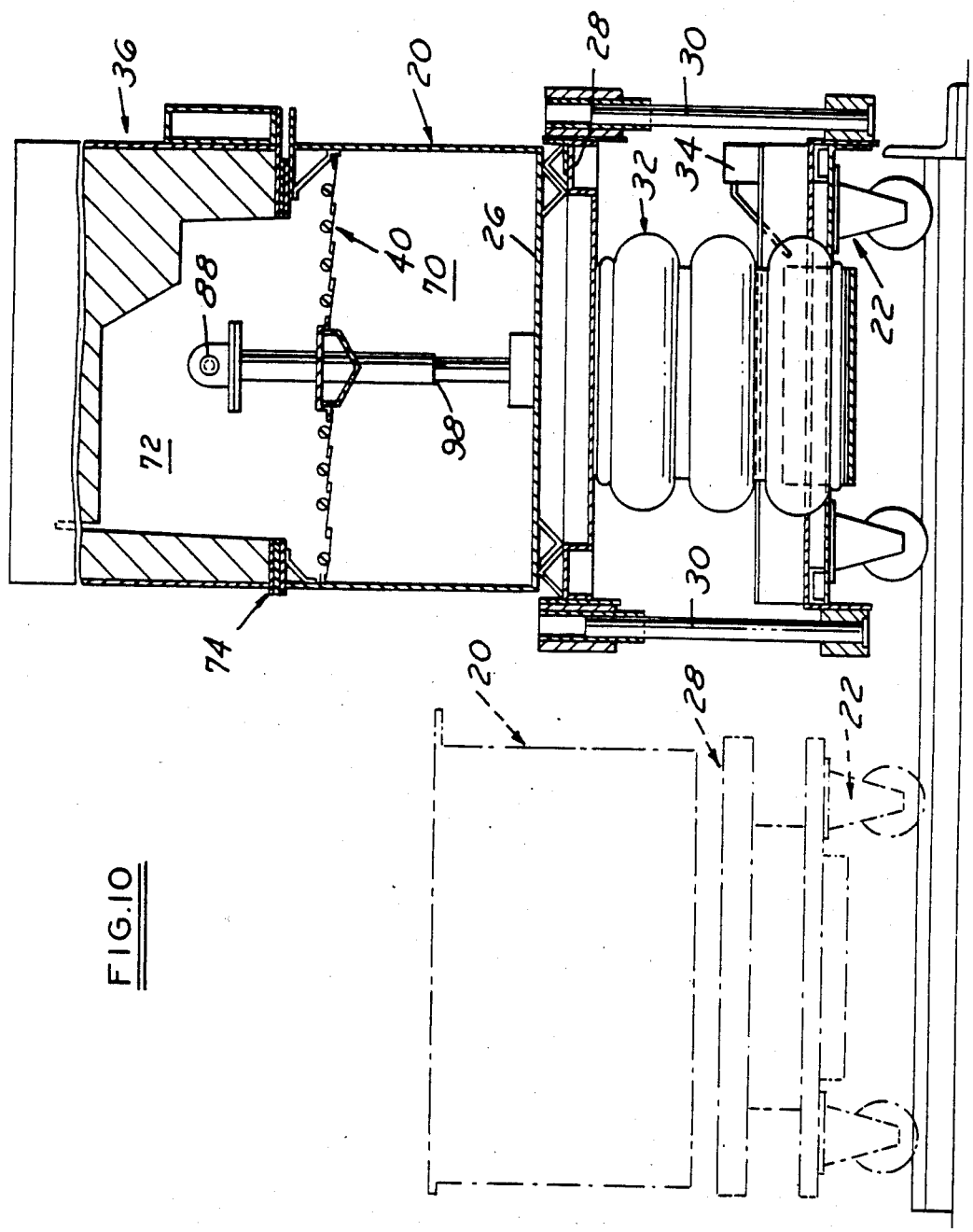
FIG. 10 is a vertical sectional view taken along the line 10—10 of FIG. 7 with a charge box shown in a side-located fill position.

The powder charge box 20 and cart 22 are more detailedly shown in FIGS. 7–9. As shown, box 20 includes a bottom 26 supported on an elevator platform 28 supported for vertical reciprocation on guide columns 30 fixed at each corner of the cart 22. The platform 28 is driven between raised and lowered positions by a pneumatic bellows-type piston 32 selectively pressurized and deflated by diagramatically illustrated air supply system 34. In the start pre-heat position of FIG. 1 the piston 32 is deflated and the platform 28 is in a retracted position on the cart 22 whereby the box 20 is free to move beneath a selectively heated mold 36 of the type set forth in U.S. Pat. No. 4,217,325 Aug. 12, 1980 issued to D. Colby. While this patent shows a slush mold system for plastisol, its mold and heating and cooling cycles are representative of those for pre-heating the mold 36 in the process sequence set forth in the start-preheat step of FIG. 1.

Figure 11:
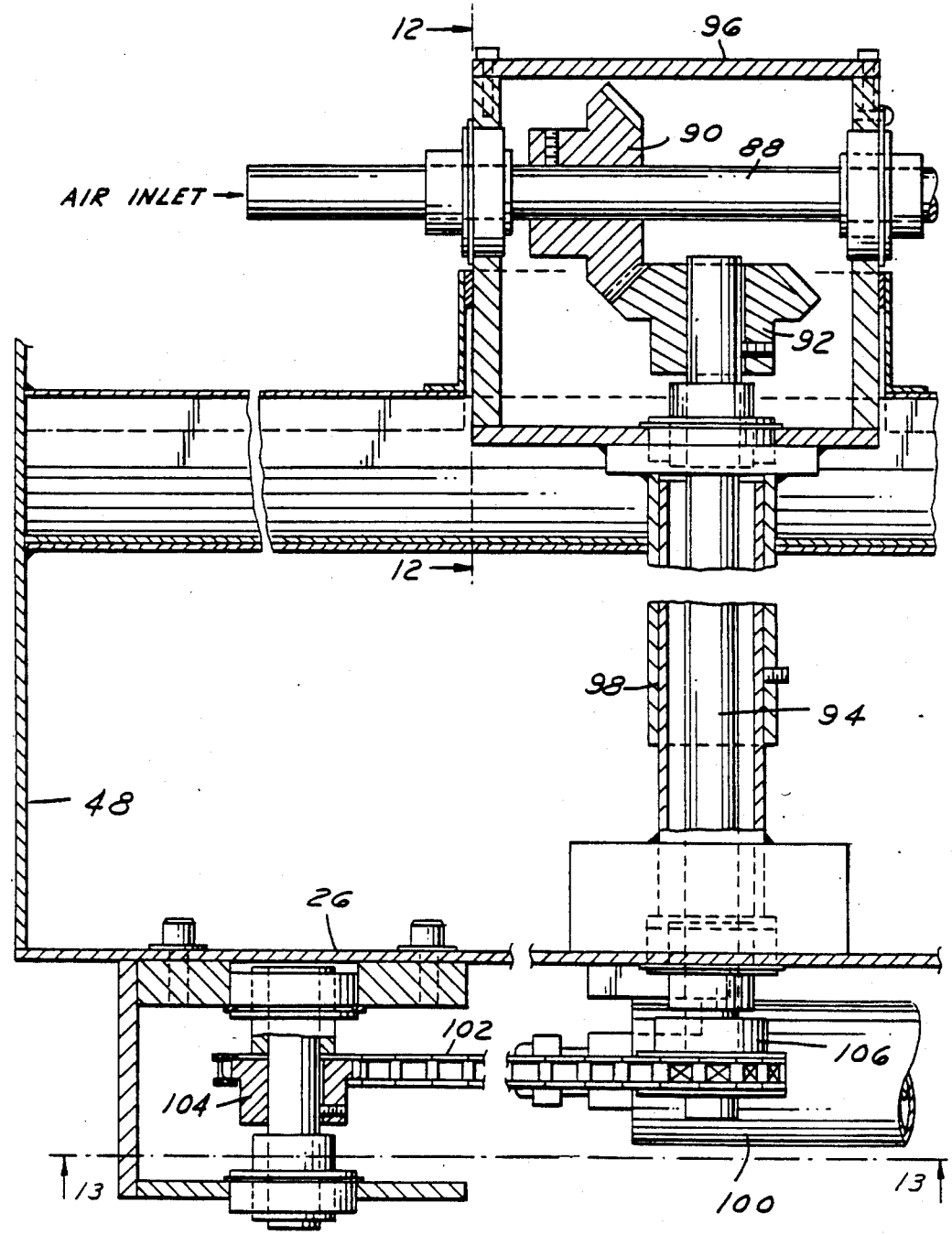
FIG. 11 is a fragmentary sectional view of one embodiment of an air blast drive in the apparatus of the present invention.
Figure 12:
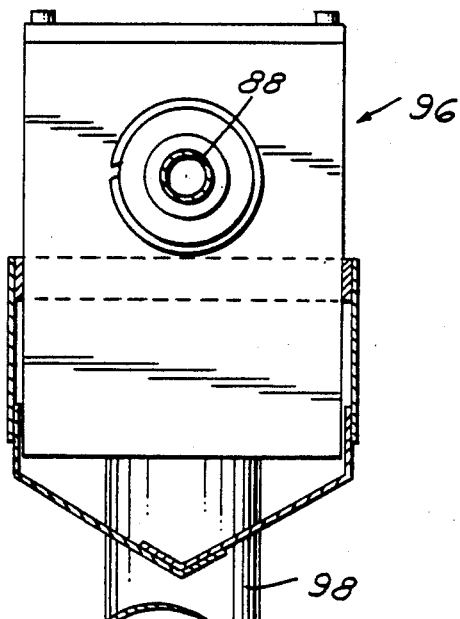
FIG. 12 is a sectional view taken along the line 12—12 of FIG. 11 looking in the direction of the arrows.
Figure 13:
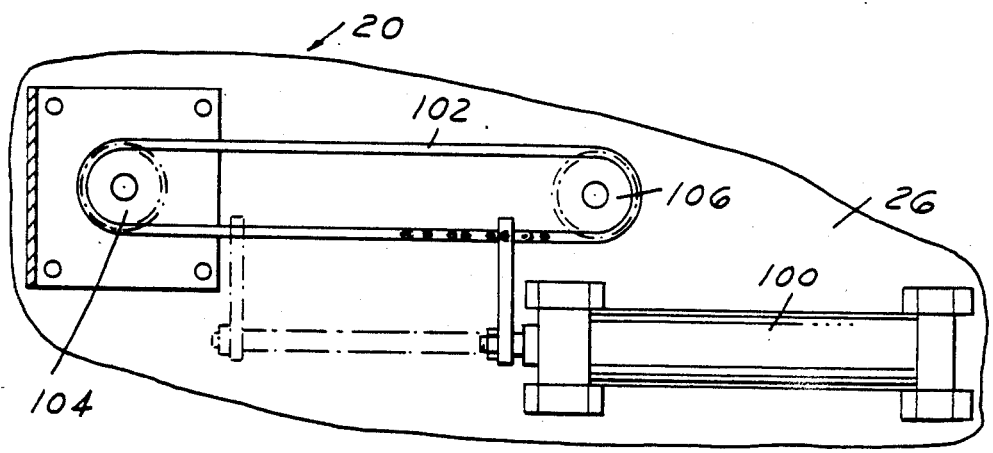
FIG. 13 is a sectional view taken along the line 13—13 of FIG. 11 looking in the direction of the arrows.

The box 20 further includes an upper open end 38 which is configured to cover the planar extent of a charge opening 39 to mold 36. The open end 38 is opened and closed by a charge control valve 40 for evenly distributing powder from box into the mold 36 during a fill or mold loading step in which mold 36 and box are disposed as shown in FIG. 3. Valve 40, more particularly, includes a plurality of louvers 42, shown in FIG. 9, each carried by a rotatable shaft 44. Each louver 42 extends across the length of box 20 and is of a width sufficient to overlap an adjacent louver 42 when the valve 40 is closed. Each louver 42 includes an edge seal 46 which engages the underside of an adjacent louver when closed. The outer louvers 42 have a pair of such seals to seal against the box as well as an adjacent louver 42. Each shaft 44 extends through opposite end walls 48, 50 of the box 20 to rotatably support the louvers 42 on the box 20. One end of each shaft as viewed in FIG. 11 is connected to a sprocket 52. A drive chain loop 54 across the sprockets 52 is operated by a suitable drive cylinder 56 connected to loop 54 by link 58. Cylinder 56 is operated by known controls to open and close the louvers.

The box 20 further includes a clamp assembly 60 including spaced clamp plates 62 movably reciprocated on box 20 by a drive cylinder 64. Each plate has a tapered slot 66 that selectively captures or releases a pair of spaced pins 68 on mold 36.

The clamp assembly 60 is closed when the powder charge box 20 is elevated by piston 32 as shown in FIGS. 2 and 7. At this step of the process the cylinder 64 is pressurized to move plates 62 into a lock position shown in FIG. 7.

As a result the interior 70 of box 20 and the interior 72 of mold 36 form a closed system 74 having a powder charge only in interior 70 at start and preheat.

The next process step includes concurrent rotation of the closed system 74 about trunnions 76 on machine frame 78. The closed louvers 42 withhold introduction of the powder until the most favorable orientation of box 20 and mold 36. During rotation the valve assembly 40 remains closed as shown in FIG. 9 and the valve assembly 40 only opens once the charge box 20 is located vertically above the mold. At this point a Fill step of the process takes place. In accordance with the invention, the drive cylinder 56 is conditioned to rotate the drive chain loop 54 to cause each louver 42 to assume the dotted line position shown in FIG. 9.

As a result a plurality of closely spaced powder feed passages 80 are defined end-to-end and side-to-side of mold charge opening 39 through which thermoplastic powder is distributed evenly as a plurality of streams throughout the charge opening 39. A resultant even build-up of melted plastic occurs on the heated walls of the mold. In particular, the louvers contribute to a fluidizing effect when they are opened and the powder starts to pour through the openings. While this is happening, the air in the mold must find its way through the powder to replace the void in the box which improves fluidization and eliminates air traps which otherwise occur in nearly 50% of the moldings if the louvers are left open during rotation to fill, and decrease to 0% when louvers are opened after the box has reached the upper position.

Following the Fill step the joined mold 36 and charge box 20 are again rotated so that the mold 36 is located vertically above the box 20.

An air-jet system 82 is then actuated to dislodge excess powder from the walls of the mold. Valve 40 is opened so that the dislodged material will flow by gravity return to the interior 70 of the box through its open end for collection and reuse in the system.

A fuse cycle is then carried out in accordance with known practice for example as set forth in U.S. Pat. No. 3,492,307 wherein the molded powder is completely fused into the desired thin walled hollow part. During the fuse step the charge box is unclamped from the inverted mold and the bellows-type piston returns box 20 to the retracted carriage position for return to a make-up position to one side of the mold. Thereafter the mold is cooled and rotated into a strip position shown in FIG. 6. Make-up powder is fed through suitable supply means shown as a chute 84 and the valve 40 which is disposed in its open position.

The air jet system 82 is in the form of an oscillating air sweep tube 88. As shown in FIG. 11 tube 88 is driven by right angle bevel gears 90, 92 connected to one end of tube 88 and a vertical drive shaft 94. The drive components are covered by box 96 and tube 98 to prevent wear. A hydraulic motor 100 drives a chain loop 102 across sprockets 104, 106 to oscillate the tube 88 so that an air jet covers all surfaces of the mold including ledges, undercuts and other detail shapes found on complex shapes such as automobile crash pads.

Figure 14:
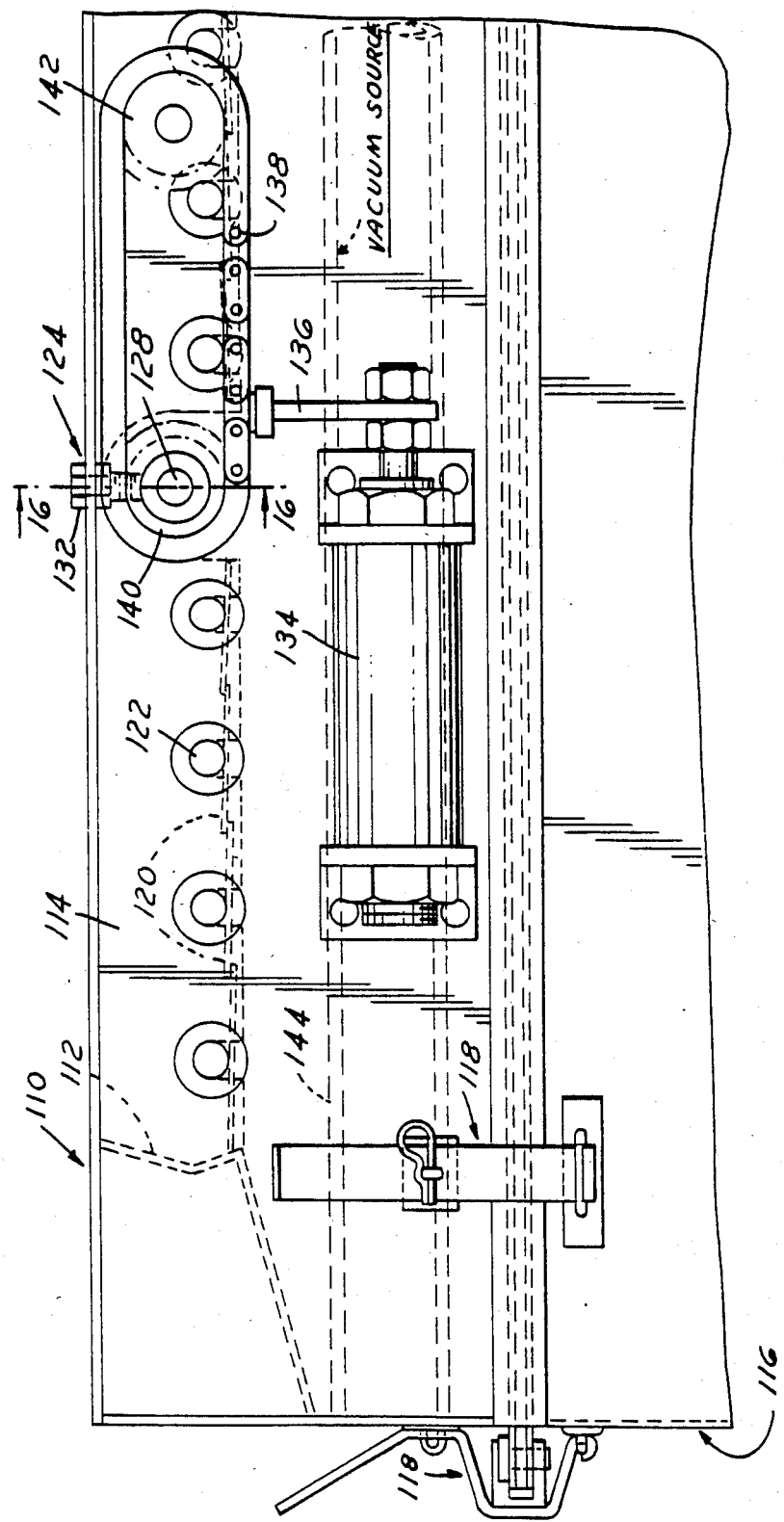
FIG. 14 is a side elevational view of another embodiment of a louver system suitable for use in practicing the present invention.
Figure 15:
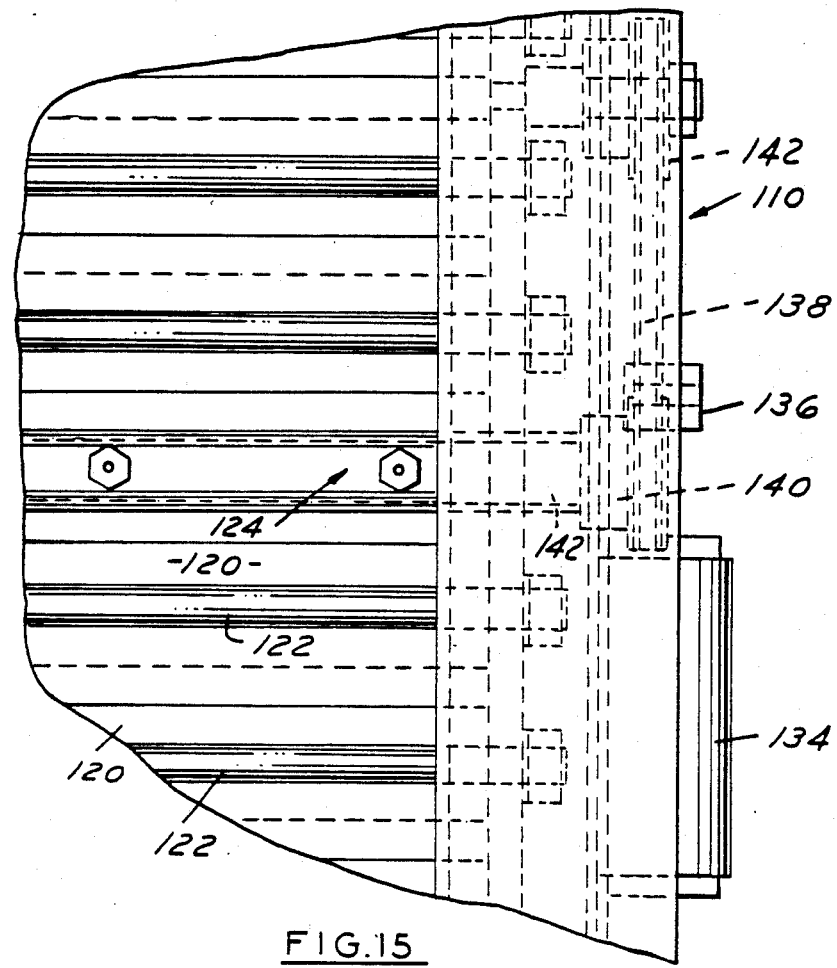
FIG. 15 is a fragmentary top elevational view of the louver system of FIG. 14.
Figure 16:
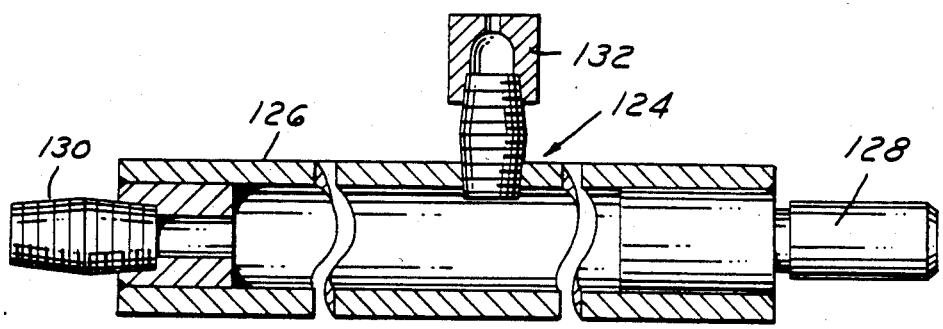
FIG. 16 is a sectional view taken along line 16—16 FIG. 15 looking in the direction of the arrows.

Another embodiment of a louver system is set forth in FIGS. 14–16. It includes a separate louver rack 110 having side inserts 112 (one shown in FIG. 14) to narrow the flow opening 114 through which powder flows from a charge box 116 into a mold (now shown). The rack 110 is connected by a series of spaced clamps 118 to the box 116. Each louver 120 has a shaft 122 pivotally supported by side walls of the rack 110. They are driven by a drive system (not shown) of the type described in the louver drive system shown in FIGS. 8 and 9.

In the embodiment of FIGS. 14–16 an air jet system 124 is located closely adjacent the opening 114 so as to be directly in line with the peripheral region of a mold connected to the box. The air jet system 124 includes an elongated tube 126 which extends across the width of opening 114. Tube 126 has a journal 128 on one end and an air supply inlet fitting 130 on its opposite end as shown in FIG. 16. Individual jets 132 are spaced on the tube 126 along its length to remove excess powder from the mold. Oscillation of tube 126 is produced by a drive motor 134 having its shaft coupled by a link 136 to a drive chain loop 138 that extends across a drive sprocket 140 connected to the outboard end 142 of tube 126 and an idler sprocket 144.

Examples of suitable processes are set forth below. The method of mold temperature control is by oil heating and cooling flow as set forth in U.S. Pat. No. 4,217,325. Suitable thermoplastic powders are plasticized polyvinyl chlorides and related vinyl resins in dry powder form for ease of gravity flow passage through valve passages 80 during both fill and return steps. Typical examples of parts, plastic materials and mold processes include the following:

Examples of parts that have been made by the PVC powder molding process include the following:
1. 1978 Pontiac Grand Prix crash pad shell
2. 1982 Volkswagen crash pad shell Volume of each mold was approximately four cubic feet.

PVC resin, plasticizer, stabilizer, release agents and color pigments are combined in a high intensity mixer to produce a dry, flowable powder. The process is known in the industry as dry-blending.

The various compound components may be selected as to type and ratio to provide the properties required both for the finished product and for ease of processing. Physical properties will not be too dissimilar from those obtained with liquid plastisol which is also used to manufacture similar products but has an inherent weakness for forming objectionable drips and runs when made in complex shapes.

Processing properties are such that when melting of the plastic powder occurs, densification results in exact reproduction of minute detail such as grain marks and stitches engraved in the mold surface.

Mold preheating temperature may range from 320° F. to 390° F. Since the thickness of the finished product is also governed by the time the powder contacts the mold, it should be understood that simultaneous charging of the powder to the mold can be of definite advantage. Also, if certain areas of the mold can be made to have a lower pre-heated temperature than others, it will permit molding a thinner shell in those areas, since both temperature and mold-filled time determine the final thickness of the shell. Therefore, a very flexible range, for mold-filled time, of one second to ten seconds or more has been established.

The powder must contact all areas of the mold that constitute part of the desired finished product. However, since the box can be contoured to match almost any given shape or mold periphery, then additional savings can be gained by reducing the surface area of the mold below that which would be required for liquid plastisol casting.

During the initial portion of the process cycle when the powder is melting to form the shell, and the main body of the powder has been dumped from the mold, there remains on the inner surface of the newly formed shell a certain amount of loosely adherent powder. This loosely adherent powder is nonuniform in thickness over the surface because of caking and packing tendencies of the PVC powder under the influence of relatively moderate heat. If the as-deposited loosely adherent powder is fused, then there will be undesirable variations in thickness. Therefore, before the box is separated from the mold, the air sweep is actuated to blow loose the excess powder. Concurrently, a negative pressure is imposed on the assembly via means such as the vacuum tube 144 shown in FIG. 14 to prevent over pressurization and expulsion of the powder into the environment. The air sweep can operate effectively in the range of 40 to 90 psi and at least one oscillation in each direction should be made by the air jet assembly for best results. Each oscillation should not take more than two seconds to complete the full arc of movement and initiation of the air sweep should commence within five seconds after dumping the powder out of the mold. Any delay will cause the excess powder to melt and prevent its being blown free.

Depending on formulation, complete melting or fusion of the PVC powder can occur when mold temperatures reach 375° F. to 400° F.

After fusion, the mold is cooled to a temperature which will facilitate removal of the shell without damage.

A typical molding cycle is as follows:

| | Temperature °F. | Elapsed Time |
|---|---|---|
| Preheat Mold | 360 | 1 Min. 10 Sec. |
| Clamp Box to Mold and Fill Mold | | 1 Min. 10 Sec. |
| Dump Powder | | 1 Min. 15 Sec. |
| Operate Air Sweep | | 1 Min. 20 Sec. |
| Disengage Box from Mold | | 1 Min. 30 Sec. |
| Start Fusion | | 1 Min. 30 Sec. |
| End Fusion | 395 | 2 Min. 30 Sec. |
| Start Cooling | | 2 Min. 30 Sec. |
| End Cooling Strip Shell | 140 | 4 Min. 30 Sec. |

Specifically the process and apparatus of the present invention enable even and complete distribution of thermoplastic powder material onto mold surfaces to form large, long, thin-walled hollow parts such as automobile crash pads formed during short cycle mold cycles in limited plant floor space.

While representative embodiments of apparatus and process of the present invention have been shown and discussed those skilled in the art will recognize that various changes and modifications may be made within the scope and equivalency range of the present invention.

What is claimed is:
1. In a process for molding a thin walled hollow plastic part from powder plastic the steps comprising:
(a) providing a mold with an open end having a planar extent overlying the full planar extent of all casting surfaces on the mold which are for receiving cast powder;
(b) providing a powder charge box with an end opening and selectively opened and closed louvers with seals thereon and having an open flow area with a planar extent substantially equal to both the planar extent of the open end of the mold and the open end of the powder charge box and having a closed position in which the seals prevent passage of powder particles through the louvers;

(c) heating the open-ended mold casting surfaces to a temperature near the fusing temperature of a powder thermoplastic material; locating the powder charge box at ambient temperature vertically below the mold and locking the powder charge box to the mold with its open end in register to form a closed system;

(d) closing the louvers when the powder charge box is located vertically below the mold to form a barrier across the full planar extent of the open end of the mold which prevents flow of powder charge from the interior of the charge box into the interior of the mold;

(e) thereafter concurrently rotating the joined charge box and pre-heated mold only about a horizontal axis while maintaining the louvers closed and the seals positioned to prevent flow of powder until the charge box is located vertically above the mold with the full planar extent of the casting surfaces disposed vertically below the louvers; and (f) thereafter opening the louvers to release the powder charge from the charge box for distribution as a plurality of streams from end-to-end and side-to-side of the open end of the mold box so as to uniformly distribute the powder charge against heated surfaces of the mold solely by downward vertical gravity flow to produce an instantaneous uniform coverage of the casting surface thereby to build up a skin of desired shape and size on the mold surfaces for receiving cast powder.

* * * * *